(12) United States Patent
Nagao

(10) Patent No.: US 6,763,143 B1
(45) Date of Patent: Jul. 13, 2004

(54) SYSTEM AND METHOD FOR VARIABLY FILTERING TO COMPENSATE FOR A LINEARLY INTERPOLATED SIGNAL

(75) Inventor: Kagenori Nagao, Amimachi (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 09/536,799

(22) Filed: Mar. 28, 2000

(30) Foreign Application Priority Data

Mar. 29, 1999 (JP) .......................................... 11/086279

(51) Int. Cl.[7] ................................................ G06K 9/40
(52) U.S. Cl. ....................... 382/261; 382/264; 382/300
(58) Field of Search ............................... 382/254, 264, 382/263, 261, 300, 266, 260

(56) References Cited

U.S. PATENT DOCUMENTS

| 5,301,266 A | | 4/1994 | Kimura | |
|---|---|---|---|---|
| 5,880,767 A | * | 3/1999 | Liu | ............................ 347/251 |
| 6,166,853 A | * | 12/2000 | Sapia et al. | ................... 359/559 |

FOREIGN PATENT DOCUMENTS

| EP | 0 450 335 A1 | 10/1991 | |
|---|---|---|---|
| JP | 2-294784 | 5/1990 | ........... G06F/15/66 |
| JP | 10-4358 | 1/1998 | |

OTHER PUBLICATIONS

Gregory A. Baxes, Digital Image Processing: principles and applications, 1994, John Wiley & Sons, pp. 107–108.*

European Search Report (Dated Jun. 6, 2003).

* cited by examiner

*Primary Examiner*—Bhavesh M. Mehta
*Assistant Examiner*—John Strege
(74) *Attorney, Agent, or Firm*—Nixon Peabody LLP; Donald R. Studebaker

(57) ABSTRACT

Linear interpolation processing is carried out on a discrete signal made up of signal components obtained by sampling an original signal in a plurality of sampling positions to obtain interpolation signal components for interpolating positions other than the sampling positions. On the linearly interpolated signal components obtained by carrying out the linear interpolation processing on the discrete signal, is carried out variable characteristic filtering processing for compensating for low-pass characteristics in the linear interpolation processing according to the position deviations between the sampling positions and the interpolating positions.

6 Claims, 6 Drawing Sheets

SYSTEM AND METHOD FOR VARIABLY FILTERING TO COMPENSATE FOR A LINEARLY INTERPOLATED SIGNAL

BACKGROUND OF THE INVENTION

1. Field of the Invention

This invention relates to a method of and a system for processing a signal, and more particularly to a method of and a system for processing a signal in which deterioration in high frequency components of a signal, which gives rise to a problem especially in a digital signal processing involving linear interpolation, is corrected.

2. Description of the Related Art

When carrying out frame rate conversion of an animation image, rotation of an image, or enlargement/contraction of an image is carried out on a.sampled image signal or when pitch conversion is carried out on a sampled sound signal, signal components for points other than sampling points (interpolating points) are required. As a method of obtaining signal components for points other than sampling points, there have been known methods in which linear interpolation is employed as disclosed, for instance, in Japanese Unexamined Patent Publication No. 2(1990)-294784 and Journal of Japanese Academy of Printing (vol.32, No.5, 1995, "Introduction to Prepress").

However, it has been known that linear interpolation generates low-pass characteristics which depend upon the interpolating positions. Analysis of low-pass characteristics generated by linear interpolation will be described on interpolation of a one-dimensional signal by way of example.

A one-dimensional signal shown in FIGS. 5A and 5B whose frequency band is limited to $-\pi/T<\omega<\pi/T$ will be discussed, hereinbelow. In FIG. 5A, f(t) is the model one-dimensional signal and F($\omega$) shown in FIG. 5B represents frequency components of the one-dimensional signal f(t). Rendering the one-dimensional signal f(t) discrete at sampling cycles T is equivalent to multiplying the one-dimensional signal f(t) by an impulse train such as represented by the following formula (1).

$$s(t) = \sum_{k=-\infty}^{\infty} \delta(t - kT) \quad (1)$$

When thus rendered discrete, the one-dimensional signal f(t) is represented by the following formula (2).

$$fs(t) = f(t) \cdot s(t) = \sum_{k=-\infty}^{\infty} f(t) \cdot \delta(t - kT) \quad (2)$$

Frequency components of the signal obtained by rendering discrete the original one-dimensional signal f(t) are obtained by Fourier transformation of fs(t) by the formula (2) and are represented by the following formula (3)

$$Fs(\omega) = v\{f(t) \cdot s(t)\} = \frac{1}{T}\sum_{k=-\infty}^{\infty} F\left(\omega - k\frac{2\pi}{T}\right) \quad (3)$$

As can be understood from formula (3), the spectrum of the signal obtained by rendering discrete the continuous signal f(t) is infinite repetition at cycles of $2\pi/T$ of the spectrum of the original signal f(t) as shown in FIGS. 6A and 6B. Accordingly, it will be understood that, by extracting the frequency components in the range of $-\pi/T<\omega<\pi/T$ by an ideal low-pass filter, a signal Fsb($\omega$) represented by the following formula (4) is obtained, and the original continuous signal f(t) can be completely restored from the signal which has been rendered discrete by inverse Fourier transformation of the signal Fsb($\omega$). The ideal low-pass filter is defined to be a filter which outputs signal components in a frequency band of $|f| \pi/T$ and cuts signal components in a frequency band of $|f|>\pi/T$. The characteristics of the ideal low-pass filter are as shown in FIG. 7.

$$Fsb(\omega) = \frac{1}{T}F(\omega) \quad (4)$$

Influence of linear interpolation on the frequency characteristics of a signal will be discussed, hereinbelow. In the following, a discrete signal obtained when the sampling timings of the original signal are retarded by $\tau \cdot T$ are approximated by linear interpolation of fs(t). Then by carrying out frequency analysis on the interpolation signal obtained by the linear interpolation, influence of linear interpolation on the frequency characteristics of a signal will be studied. The interpolation signal is as shown in FIG. 8 and represented by fs'(t) in the following formula (5).

$$fs'(t) = [(1-\tau)f(t-\tau T) + \tau f\{t + (1-\tau)T\}] \cdot \sum_{k=-\infty}^{\infty} \delta\{t - (k+\tau)T\} \quad (5)$$

Fourier transformation of the formula (5) gives the following formula (6).

$$Fs'(\omega) = \frac{1}{T}\{(1-\tau)F(\omega) \cdot e^{-j\tau T\omega} + \tau F(\omega)e^{j(1-\tau)T\omega}\} * \quad (6)$$

$$\sum_{k=-\infty}^{\infty} \delta\left(\omega - k\frac{2\pi}{T}\right) \cdot e^{-j\tau T\omega}$$

$$= \frac{1}{T}[\{(1-\tau) + \tau e^{jT\omega}\} \cdot F(\omega) \cdot e^{-j\tau T\omega}] *$$

$$\left[e^{-j\tau T\omega} \cdot \sum_{k=-\infty}^{\infty} \delta\left(\omega - k\frac{2\pi}{T}\right)\right]$$

$$= \frac{1}{T}\sum_{k=-\infty}^{\infty}\left\{1 - \tau + \tau e^{jT\left(\omega - k\frac{2\pi}{T}\right)}\right\} \cdot F\left(\omega - k\frac{2\pi}{T}\right) \cdot$$

$$e^{j\tau T\left(\omega - k\frac{2\pi}{T}\right)} \cdot e^{-j2\pi k\tau}$$

$$= \frac{1}{T}\sum_{k=-\infty}^{\infty}\left\{1 - \tau + \tau e^{jT\left(\omega - k\frac{2\pi}{T}\right)}\right\} \cdot F\left(\omega - k\frac{2\pi}{T}\right) \cdot e^{-j\tau T\omega}$$

The signal represented by formula (6) is still in the form of infinite repetition at cycles of $2\pi/T$ of the signal whose frequency band is limited to $-\pi/T<\omega<\pi/T$. When extracting the frequency components in the range of $-\pi/T<\omega<\pi/T$ by an ideal low-pass filter, a signal Fsb'($\omega$) represented by the following formula (7) is obtained, and a signal which is close to the original continuous signal in spectrum can be restored. However, unlike the signal represented by formula (4), the signal represented by formula (7) is a signal obtained by applying band-pass characteristics represented by filtering characteristics of the following formula (8) to the spectrum of the original signal.

$$Fsb'(\omega) = \frac{1}{T}(1 - \tau + \tau e^{jT\omega}) \cdot e^{-j\tau T\omega} \cdot F(\omega) \quad (7)$$

$$filter(\omega, \tau) = \frac{1}{T}(1 - \tau + \tau e^{jT\omega}) \cdot e^{-j\tau T\omega} \quad (8)$$

The gain characteristics of the filter represented by formula (8) are as shown by the following formula (9).

$$|filter(\omega, \tau)| = \frac{1}{T}|1 - \tau + \tau e^{jT\omega}| \quad (9)$$

$$= \frac{1}{T}\{(1-\tau)^2 + \tau^2 + 2\tau(1-\tau)\cos T\omega\}^{1/2}$$

The formula in { } on the right side of formula (9) can be changed to the following formula (9a). Since $2(1-\cos T\omega) \geq 0$, formula (9) is minimized when $\tau=\frac{1}{2}$ and maximized when $\tau=0$ or 1. That is, attenuation is maximized when $\tau=\frac{1}{2}$, and is nullified when $\tau=0$ or 1.

$$(1-\tau)^2 + \tau^2 + 2\tau(1-\tau)\cos T\omega = \quad (9a)$$

$$2(1 - \cos T\omega)(\tau - 1/2)^2 - \frac{1}{2}(1 - \cos T\omega) + 1$$

Further, since $$(1-\tau)^2 + \tau^2 + 2\tau(1-\tau)\cos T\omega = 2(1 - \cos T\omega)\left\{(\tau - 1/2)^2 - \frac{1}{4}\right\} + 1 \quad (9b)$$

and $0 \leq \tau \leq 1$, the characteristics of amplitude factor when $\tau$ is fixed are as shown in FIG. 9. Further, it will be understood from FIG. 9 that the filter represented by formula (8) has low-pass characteristics and attenuation of high-frequency components depends on the value of $\tau$. The characteristics of the filter when $\tau=\frac{1}{2}$ are as represented by the following formula (10).

$$\left|filter\left(\omega, \frac{1}{2}\right)\right| = \frac{1}{T}\left|\cos\frac{T}{2}\omega\right| \quad (10)$$

Analysis of low-pass characteristics generated by linear interpolation of a one-dimensional signal is carried out in the manner described above. The similar characteristics are generated when interpolation is carried out on a two-dimensional sampled signal such as an image signal. Low-pass characteristics generated when a sampled signal obtained by translation of a two-dimensional sampled signal is obtained by interpolation approximation of the original two-dimensional signal are as represented by the following formula (11), wherein $T_x$ and $T_y$ respectively represent the sampling cycles in the directions of x-axis and y-axis, and accordingly, (dx, dy) represents the amount of translation of the sampling positions normalized by the sampling cycles.

$$|filter(u, v, dx, dy)| = \frac{1}{T_xT_y}|1 - dx + dx \cdot e^{jT_xu}| \cdot |1 - dy + dy \cdot e^{jT_yv}| \quad (11)$$

The low-pass characteristics represented by formula (11) are generated when sampled values in the interpolating positions are obtained from values of original four sampling positions surrounding each interpolating positions by linear interpolation approximation represented by the following formula (12).

$$pi(x+dxT_x, y+dyT_y)=(1-dx)(1-dy)\cdot p(x, y)+dx(1-dy)\cdot p(x+T_x, y)+(1-dx)dy\cdot p(x, y+T_y)+dx\cdot dy\cdot p(x+T_x, y+T_y) \quad (12)$$

As in the one-dimensional signal described above, also the filter represented by formula (11) has low-pass characteristics where attenuation of high-frequency components changes depending upon the normalized position deviation between the original sampling positions and the interpolating sampling positions. The attenuation of the high-frequency components is minimized (or nullified) when dx=0 or 1 and dy=0 or 1, and maximized when dx=½ and dy=½. The characteristics of the filter when dx=½ and dy=½ are as represented by the following formula (13).

$$\left|filter\left(u, v, \frac{1}{2}, \frac{1}{2}\right)\right| = \frac{1}{T_xT_y}\left|\cos\frac{T_xu}{2} \cdot \cos\frac{T_yv}{2}\right| \quad (13)$$

As can be understood from the description above, when linear interpolation is carried out, there is generated deterioration of high-frequency components which depends upon the interpolating positions. Accordingly, there arises a problem that when retarding of a sound signal or translation of an image signal is carried out by linear interpolation processing, the frequency characteristics of the processed signal become different from those of the original signal due to difference in the amount of retardation or the amount of translation.

Further, when fine adjustment of an animation image signal, rotation of an image by a fine angle, fine adjustment of the rate of enlarging or contracting or fine adjustment of sound pitches is effected by linear interpolation, a more complicated problem arises. When the amount of adjustment is very small, the deviations between sampling positions and interpolating positions are substantially uniform so long as the signal is locally seen. However when the signal is seen in perspective, the position deviations largely fluctuate periodically and the image periodically becomes unsharp or sound periodically gets cracked.

SUMMARY OF THE INVENTION

In view of the foregoing observations and description, the primary object of the present invention is to provide a signal processing method and a signal processing system which can prevent deterioration of high-frequency components or generation of unsharpness in an image when linear interpolation processing is carried out.

In accordance with a first aspect of the present invention, there is provided a signal processing method for carrying out, on a discrete signal made up of signal components obtained by sampling an original signal in a plurality of sampling positions, linear interpolation processing to obtain interpolation signal components for interpolating positions other than the sampling positions, wherein the improvement comprises the step of carrying out, on the linearly interpolated signal components obtained by carrying out the linear interpolation processing on the discrete signal, variable characteristic filtering processing for compensating for low-pass characteristics in the linear interpolation processing according to the position deviations between the sampling positions and the interpolating positions.

In the signal processing method of this invention, it is preferred that the variable characteristic filtering processing be carried out by use of a filter having as a transfer function an inverse function of the low-pass characteristics in the linear interpolation processing.

In the signal processing method of this invention, it is also preferred that the variable characteristic filtering processing be filtering processing in which the strength of application of a differential operator is changed according to the position deviations between the sampling positions and the interpolating positions.

In accordance with a second aspect of the present invention, there is provided a signal processing system for carrying out, on a discrete signal made up of signal components obtained by sampling an original signal in a plurality of sampling positions, linear interpolation processing to obtain interpolation signal components for interpolating positions other than the sampling positions, wherein the improvement comprises a filtering processor means which carries out, on the linearly interpolated signal components obtained by carrying out the linear interpolation processing on the discrete signal, variable characteristic filtering processing for compensating for low-pass characteristics in the linear interpolation processing according to the position deviations between the sampling positions and the interpolating positions.

In the signal processing system of this invention, it is preferred that the filtering processor means carries out the variable characteristic filtering processing by use of a filter having as a transfer function an inverse function of the low-pass characteristics in the linear interpolation processing, or by changing the strength of application of a differential operator according to the position deviations between the sampling positions and the interpolating positions.

In the signal processing method and the signal processing system of the present invention, since variable characteristic filtering processing in which low-pass characteristics in the linear interpolation processing are compensated for according to the position deviations between the sampling positions and the interpolating positions is carried out on the interpolation signal components, deterioration in high frequency components of a signal, which gives rise to a problem especially in a digital signal processing involving linear interpolation, can be effectively corrected. Further by applying the present invention to image processing or sound signal processing, the phenomenon that the image periodically becomes unsharp when fine adjustment of an animation image signal, rotation of an image by a fine angle, or fine adjustment of the rate of enlarging or contracting is effected or the phenomenon that sound periodically gets cracked when fine adjustment of sound pitches is effected can be suppressed.

DESCRIPTION OF THE PREFERRED EMBODIMENT

Figure 1:
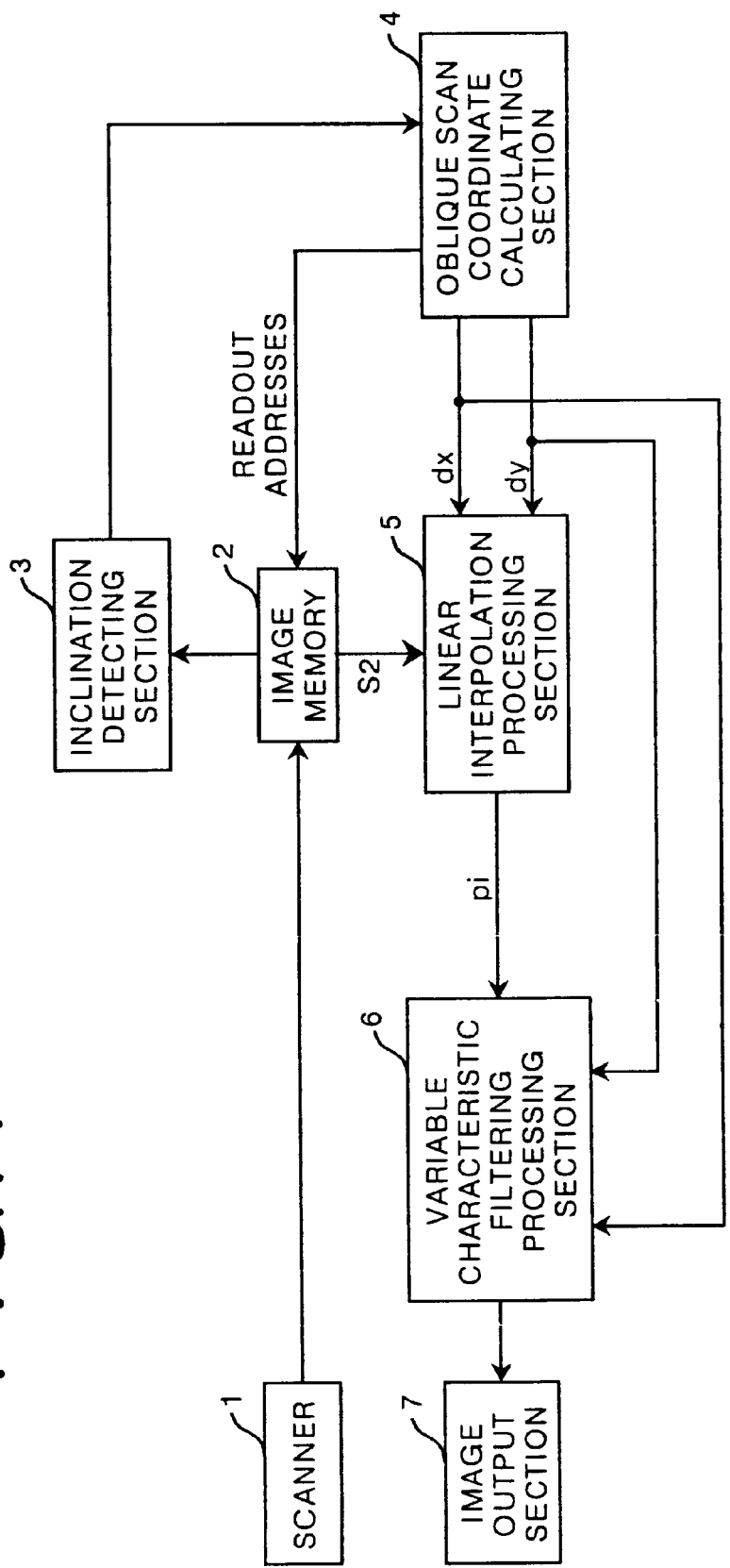
FIG. 1 is a block diagram showing a copier with function for correcting inclination of an original in which a signal processing system in accordance with an embodiment of the present invention is employed.

FIG. 1 shows a copier with function for correcting inclination of an original in which a signal processing system in accordance with an embodiment of the present invention is employed. The function for correcting inclination of an original is for correcting an angle of inclination of an original not larger than several degrees such as skew of prints with respect to the original or error in angle of the original to a scanner which is caused when the image on the original is read out by the scanner.

An image signal made up of image signal components S1 which are obtained by sampling an image signal read out by a scanner 1 (will be referred to as "real sampled image signal components S1", hereinbelow) is once stored in an image memory 2. An inclination detecting section 3 detects an angle of rotation $\theta 1$ by which the input image is to be rotated to correct the inclination of the image. The inclination detecting section 3 may be arranged so that the operator directly inputs an angle of inclination of the image into the inclination detecting section 3 and the inclination detecting section detects the angle of rotation $\theta 1$ from the angle of inclination of the image input by the operator. The inclination detecting section 3 outputs the angle of rotation $\theta 1$ thus detected to an oblique scan coordinate calculating section 4.

Figure 2A:
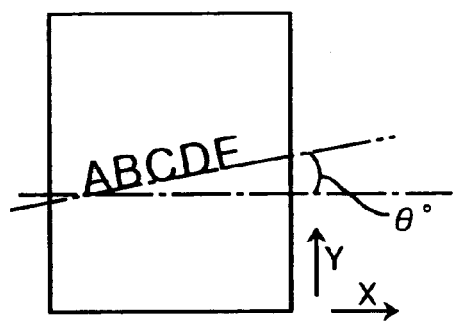
FIGS. 2A to 2C are views for describing a principle of correcting inclination of an original.

Rotation of the image is effected by obliquely scanning the original image at an angle equal to the angle of rotation $\theta 1$ and re-sampling the original image. This principle will be described with respect to correcting the inclination of an image of a character string which is inclined at angle $\theta 0$ as shown in FIG. 2A as an example. In FIG. 2A, the horizontal direction and the vertical direction are taken as x-axis and y-axis, respectively, and the center of the image is taken as the origin. Positions (xm, yn) in which the original image is sampled by the scanner (will be referred to as "the real sampling positions", hereinbelow) are represented by the following formula (14).

$$\begin{pmatrix} x_m \\ y_n \end{pmatrix} = \begin{pmatrix} m \cdot T_x \\ n \cdot T_y \end{pmatrix} \quad (14)$$

In formula (14), $T_x$, $T_y$ respectively the sampling cycles in the x-direction and the y-direction, and (m, n) is as represented by the following formula (15).

$$m = -m_{max}, \ldots, -2, -1, 0, 1, 2, \ldots, m_{max}$$

$$n = -n_{max}, \ldots, -2, -1, 0, 1, 2, \ldots, n_{max} \quad (15)$$

Accordingly, the size of the image taken in by the scanner 1 is as represented by the following formula (16).

$$T_x \cdot (2 \cdot m_{max} + 1) \times T_y \cdot (2 \cdot n_{max} + 1) \quad (16)$$

Figure 2B:
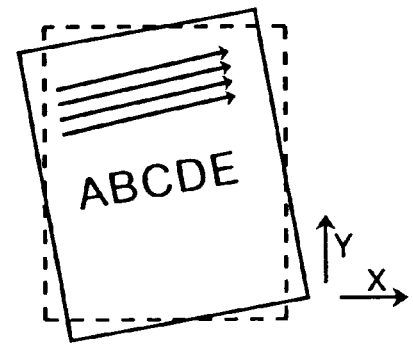
Figure 2C:
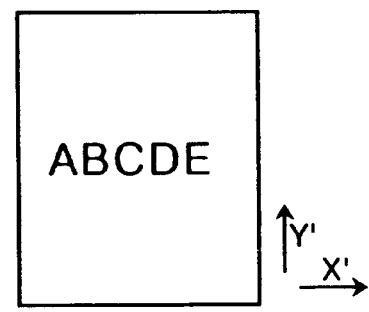

In order to rotate the image shown in FIG. 2A by $-\theta 0$ to correct the inclination of the image, the main scanning is obliquely effected at angle $\theta 0$ as shown in FIG. 2B and the image data in the frame shown by the solid line in FIG. 2B is re-sampled. That is, when the image is viewed on a x'-y' coordinate system obtained by rotating the x-y coordinate system by θ0, the inclination of the image is corrected as shown in FIG. 2C.

It is assumed that the coordinates of an m-th sampling point on an n-th main scanning line on the x'-y' coordinate system are $(x'_m, y'_n)$ When it is assumed that the position $(x'_m, y'_n)$ on the x'-y' coordinate system corresponds to a position $(x''_m, y''_n)$ on the x-y coordinate system, the coordinates $(x''_m, y''_n)$ and the coordinates $(x_m, y_n)$ are in the relation represented by the following formula (17).

$$\begin{pmatrix} x''_m \\ y''_n \end{pmatrix} = \begin{pmatrix} \cos\theta 0 & -\sin\theta 0 \\ \sin\theta 0 & \cos\theta 0 \end{pmatrix} \begin{pmatrix} x_m \\ y_n \end{pmatrix} \quad (17)$$

By re-sampling the original image with the coordinates $(x''_m, y''_n)$ taken as new sampling points, the image can be rotated.

However, the coordinates $(x''_m, y''_n)$ generally do not conform to the real sampling positions. Further, since only the real sampled values for the sampling points represented by the coordinates $(x_m, y_n)$ in formula (14) have been stored in the image memory 2 shown in FIG. 1, it is necessary to carry out some picture element restoring processing in order to obtain sampled values for the sampling points represented by the coordinates $(x''_m, y''_n)$ in formula (17). A method in which the value of the picture element in the position $(x''_m, y''_n)$ is restored by linear estimation from sampled values for four real sampling points surrounding the position $(x''_m, y''_n)$ will be described here.

It is assumed that the coordinates of the four real sampling points surrounding the position $(x''_m, y''_n)$ are (xa, yb), (xa+$T_x$, yb), (xa, yb+$T_y$) and (xa+$T_x$, yb+$T_y$), respectively. The oblique scan coordinate calculating section 4 in FIG. 1 calculates memory addresses corresponding to the four real sampling points and outputs the memory addresses as readout addresses. Sampled image signal components S2 for the four real sampling points are read out from the image memory 2 and the sampled image signal components S2 are sent to a linear interpolation processing section 5.

In the linear interpolation processing section 5, an interpolated image signal component $pi(x''_m, y''_n)$ for the position $(x''_m, y''_n)$ is obtained on the basis of the sampled image signal components S2 for the four real sampling points and the deviation of the interpolated sampling position from the real sampling positions. The deviation of the interpolated sampling position from the real sampling positions (dx·$T_x$, dy·$T_y$) is represented by the following formula (18).

$$\begin{pmatrix} dxT_x \\ dyT_y \end{pmatrix} = \begin{pmatrix} x''_m - x_a \\ y''_n - y_b \end{pmatrix} \quad (18)$$

Since $(x''_m, y''_n)$=(xa+dx·$T_x$, yb+dy·$T_y$) from formula (18), the interpolated image signal component $pi(x''_m, y''_n)$ for the position $(x''_m, y''_n)$ can be obtained by substituting x=xa, y=yb in the aforesaid formula (12). The position deviation (dx, dy) normalized by the sampling cycles used in formula (12) is output from the oblique scan coordinate calculating section 4. As described above, the system of this embodiment is for correcting inclination of the original by a small angle, and the normalized position deviation (dx, dy) is substantially uniform for interpolated sampling positions which are near to each other provided that the angle of correction of inclination is small. In order to improve this fact, normalized position deviations (dx, dy) and (d'x, d'y) for interpolated sampling points $(x''_m, y''_n)$ and $(x''_{m+i}, y''_{m+j})$ will be discussed, hereinbelow. $(x''_{m+i}, y''_{m+j})$ represents the position on the x-y coordinate system of an interpolated sampling point $(x'_{m+i}, y'_{n+j})$ at a distance of i sampling points in the direction of x'-axis and j sampling points in the direction of y'-axis from a point represented by coordinates $(x'_m, y'_n)$ on the x'-y' coordinate system. The normalized position deviations (dx, dy) and (d'x, d'y) are in the relation represented by the following formula (19).

$$\begin{pmatrix} dx' \\ dy' \end{pmatrix} = \begin{pmatrix} dx \\ dy \end{pmatrix} + \begin{pmatrix} i(\cos\theta 1 - 1) - \dfrac{T_y}{T_x} j\sin\theta 1 \\ j(\cos\theta 1 - 1) + \dfrac{T_x}{T_y} i\sin\theta 1 \end{pmatrix} \quad (19)$$

In formula (19), θ1 represents the angle of correction of inclination. Since θ1 is a very small angle, the normalized position deviations for the two interpolated sampling positions are substantially the same so long as i and j in formula (19) represent small integers provided that the sampling cycles in the main scanning direction and the sub-scanning direction differ from each other by a large amount. That is, the normalized position deviation is substantially uniform for interpolated sampling positions which are near to each other. Conversely, if i and j in formula (19) represent large integers, the normalized position deviations for the two interpolated sampling positions largely differ from each other. That is, the normalized position deviations for interpolated sampling positions which are far from each other largely differ from each other.

As can be understood from the aforesaid formula (11), the low-pass characteristics generated by interpolation depend upon (dx, dy). That is, when a small angle of inclination is to be corrected by linear interpolation processing, it may be considered that the low-pass characteristics generated by the interpolation processing are locally substantially uniform since the normalized position deviation is locally substantially uniform. Two-dimensional FIR filters generally used in digital image processing are small and of 3×3 or 5×5 in size for the purpose of easiness of arranging the circuit. Since it may be considered that the low-pass characteristics in a small region such as 3×3 or 5×5 are uniform, unsharpness generated by linear interpolation can be corrected by common correction filter processing using, for instance, an inverse filter. Though being substantially uniform when locally seen, the low-pass characteristics largely fluctuate from place to place when seen in perspective. Accordingly, it is impossible to correct unsharpness over the entire image by a single characteristic filtering processing. Thus variable characteristic filtering processing becomes necessary.

In a variable characteristic filtering processing section 6 in FIG. 1, correction of unsharpness of the image generated by linear interpolation is carried out on the interpolated image signal components $pi(x''_m, y''_n)$. As shown in formula (11), the characteristic of unsharpness generated changes according to the position deviation between the interpolating position and the sampling position, and accordingly, in the variable characteristic filtering processing section 6, unsharpness correction processing is carried out by use of a filter having different band-pass characteristic according to the value of (dx, dy). Two methods of realizing variable characteristic filtering processing will be described, hereinbelow.

One of the methods is a method in which an inverse filter having a transfer characteristic which is an inverse function of the low-pass characteristics generated by the interpolation is applied to the interpolated image. Since the low-pass characteristics generated by the interpolation differ according to the position deviation between the interpolating position and the sampling position as shown in formula (11), the transfer characteristic of the inverse filter should be variable according to the position deviation. When the processing speed need not be so high, the variable characteristic filter can be formed by signal processing by software using a DSP (digital signal processor) or the like.

Figure 3:
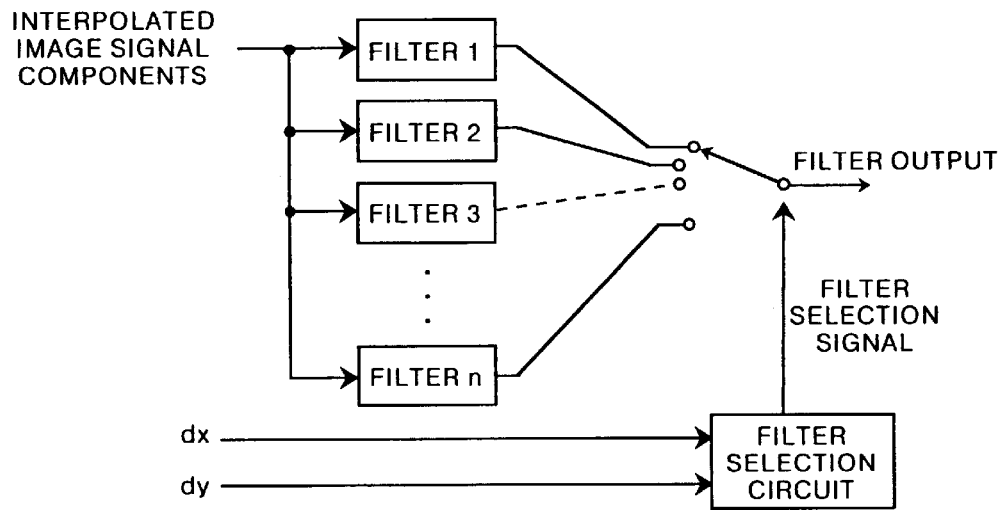
FIG. 3 is a view showing a variable characteristic filter using a filter bank.

To the contrast, when the processing speed should be high, the variable characteristic filter can be realized by forming exclusive hardware of a filter bank system as shown in FIG. 3. In accordance with the filter bank system shown in FIG. 3, desired inverse filter characteristics can be accurately realized and highly accurate unsharpness correction becomes feasible. However, since the number of the filters in the filter bank must be increased in order to improve the accuracy of correction, there is a problem that the scale of the circuit becomes large.

Figure 4:
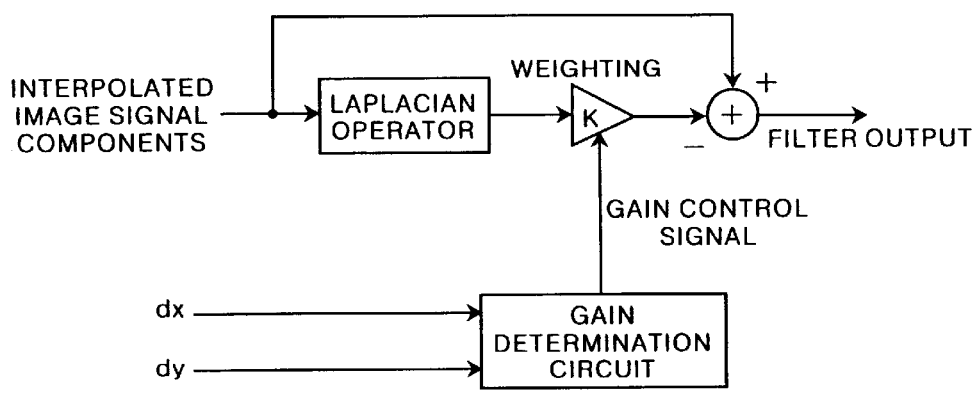
FIG. 4 is a view showing a variable characteristic filter using a differential operator.
Figure 5A:
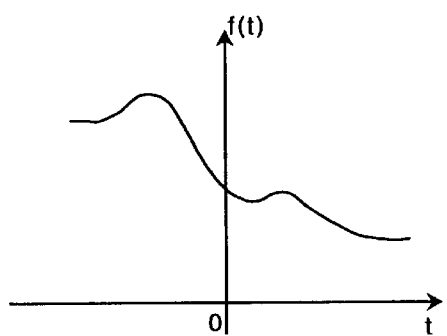
FIGS. 5A and 5B are views showing frequency characteristics of a one-dimensional signal to be evaluated, FIGS. 6A and 6B; are views illustrating rendering discrete the original signal f(t)
Figure 5B:
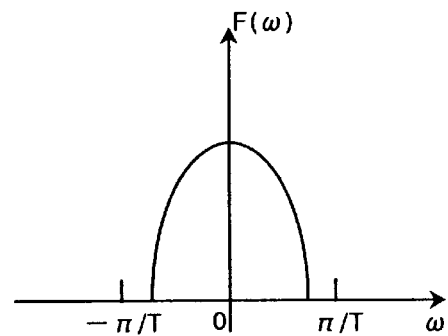
Figure 6A:
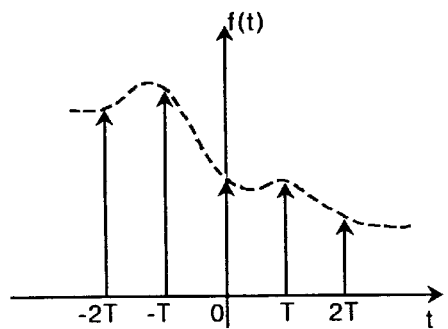
Figure 6B:
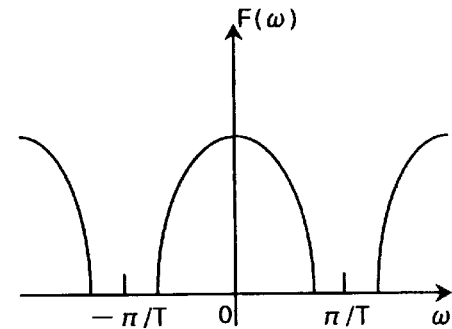
Figure 7:
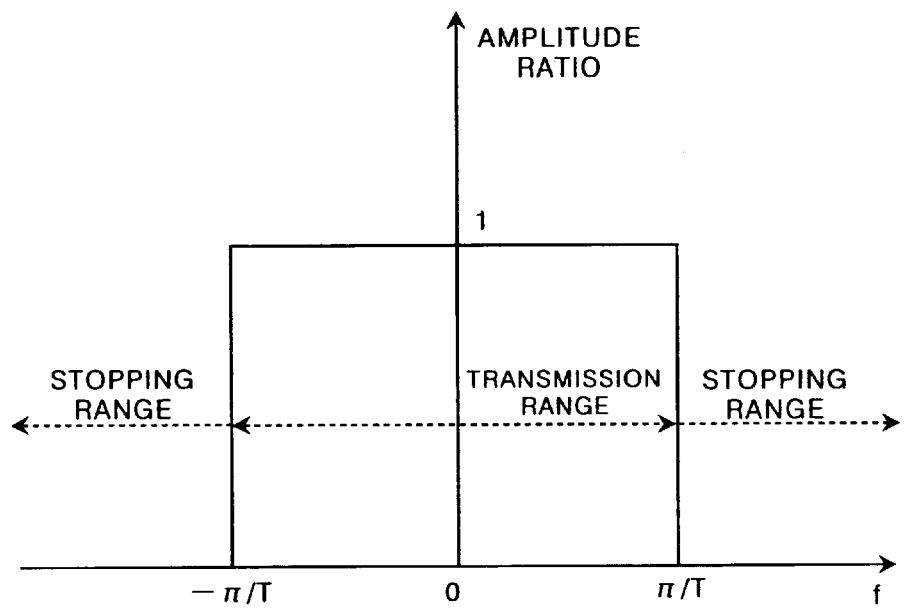
FIG. 7 is a view showing the characteristics of the ideal low-pass filter.
Figure 8:
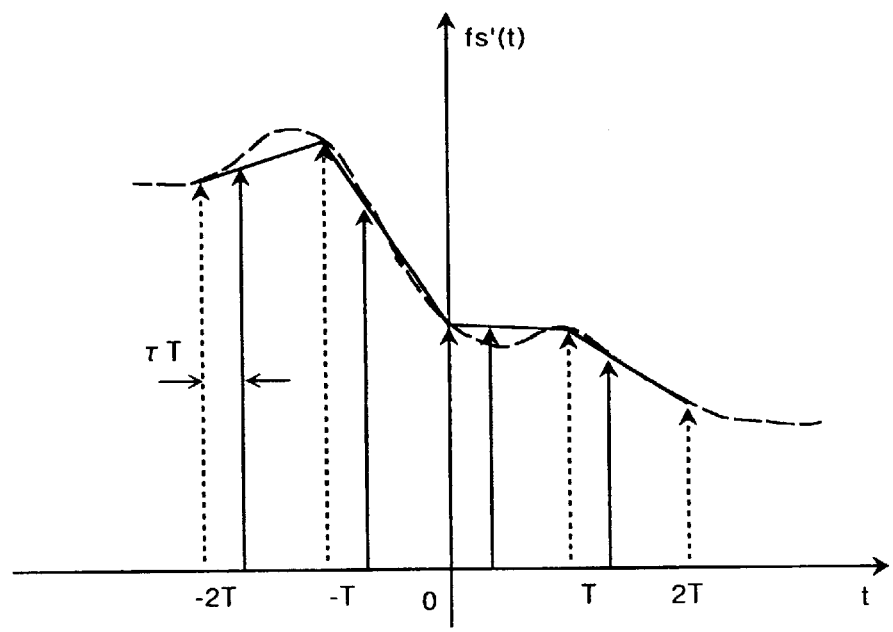
FIG. 8 is a view showing a discrete signal when the sampling timings of the original signal are retarded by $\tau \cdot T$, the discrete signal being approximated by linear interpolation.
Figure 9:
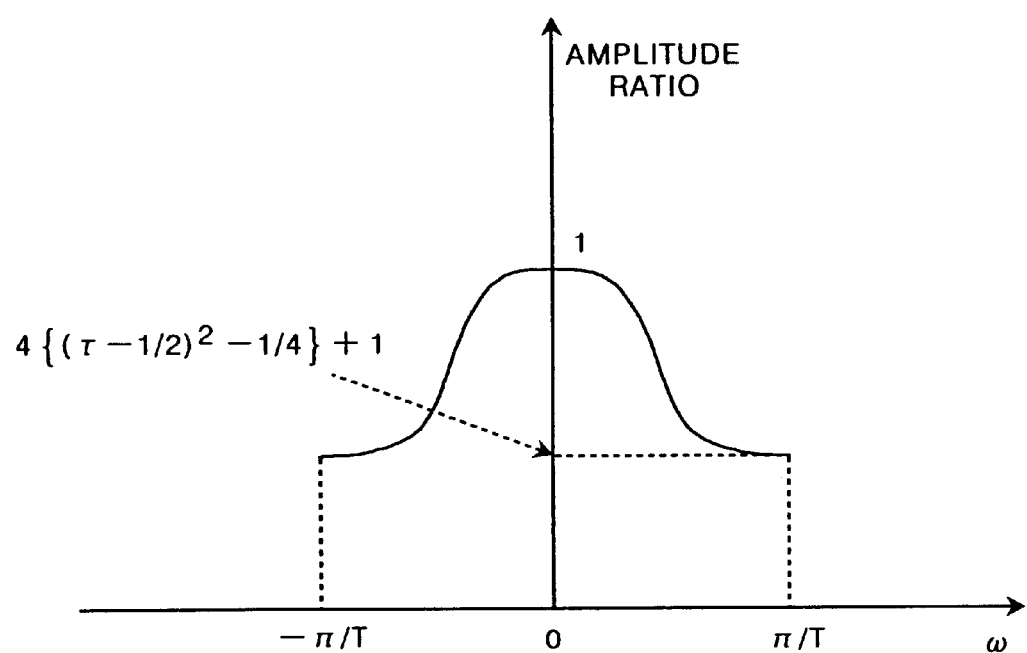
FIG. 9 is a view showing the characteristics of the filter represented by formula (8).

The other of said two methods of realizing variable characteristic filtering processing is a method in which a differential operator is used and the strength of application of the differential operator is changed by weighting as shown in FIG. 4. In this method, though accuracy of correction of unsharpness is lower as compared with the filter bank system, variable characteristic filtering processing can be approximately realized by use of simpler hardware.

In the example shown in FIG. 4, a Laplacian operator is employed as the differential operator. When the interpolated image signal component and the filter output are respectively represented by pi(x', y') and pif(x', y', dx, dy) by use of the notation on the aforesaid x'-y' coordinate system, the filter output is as represented by the following formula (20).

$$pif(x', y', dx, dy) = pi(x', y') - k(dx, dy) \cdot \nabla^2 pi(x', y') \quad (20)$$

In formula (20), function k(dx,dy) governs the strength of application of the Laplacian operator. As described above, unsharpness generated by interpolation processing is maximized when the normalized position deviation (dx,dy) of the interpolating position from the sampling position is (dx,dy)=(½, ½) and is reduced as the interpolating position approaches the sampling position. No unsharpness is generated when the interpolating position coincides with the sampling position. Accordingly, when the function k(dx,dy) is such that it takes a maximum value when (dx,dy)=(½, ½), decreases as the interpolating position approaches the sampling position, and becomes 0 when the interpolating position coincides with the sampling position, the variable characteristic filtering processing can be approximately realized. An example of such a function k(dx,dy) is shown in the following formula (21).

$$k(dx, dy) = 1 - \left|dx - \frac{1}{2}\right| - \left|dy - \frac{1}{2}\right| \quad (21)$$

The gain determination circuit in FIG. 4 outputs a gain control signal having a value represented by formula (21).

In the manner described above, unsharpness generated by interpolation processing is corrected and the corrected image signal is sent to the image output section 7 shown in FIG. 1, whereby printing is. effected on the basis of the inclination-corrected image signal.

What is claimed is:

1. A signal processing method for carrying out, on a discrete signal made up of signal components obtained by sampling an original signal in a plurality of sampling positions, linear interpolation processing to obtain interpolation signal components for interpolating positions other than the sampling positions, wherein the improvement comprises the step of:

carrying out, on the linearly interpolated signal components obtained by carrying out the linear interpolation processing on the discrete signal, variable characteristic filter processing to compensate for low-pass characteristics in the linear interpolation processing, wherein the compensation is based upon position deviations between the sampling positions and the interpolating positions, and wherein when the position deviation of the interpolating position from the sampling position is a maximum, the compensation is maximized, when the interpolating position approaches the sampling position, the compensation is decreased and when the interpolating position coincides with the sampling position, the compensation is zero.

2. A signal processing method as defined in claim 1 in which the variable characteristic filter processing is carried out by use of a filter having as a transfer function an inverse function of the low-pass characteristics in the linear interpolation processing.

3. A signal processing method as defined in claim 1, in which the variable characteristic filter processing is filtering processing in which the strength of application of a differential operator is changed according to the position deviations between the sampling positions and the interpolating positions.

4. A signal processing system for carrying out, on a discrete signal made up of signal components obtained by sampling an original signal in a plurality of sampling positions, linear interpolation processing to obtain interpolation signal components for interpolating positions other than sampling positions, wherein the improvement comprises a filtering processor means which carries out, on the linearly interpolated signal components obtained by carrying out the linear interpolation processing on the discrete signal, variable characteristic filter processing to compensate for low-pass characteristics in the linear interpolation processing, wherein the compensation is based upon position deviations between the sampling positions and the interpolating positions, and wherein when the position deviation of the interpolating position from the sampling position is a maximum, the compensation is maximized, when the interpolating position approaches the sampling position, the compensation is decreased and when the interpolating position coincides with the sampling position, the compensation is zero.

5. A signal processing system as defined in claim 4 in which the filtering processor means carries out the variable characteristic filter processing by use of a filter having as a transfer function an inverse function of the low-pass characteristics in the linear interpolation processing.

6. A signal processing system as defined in claim 4 in which the filtering processor means carries out the variable characteristic filter by changing the strength of application of a differential operator according to the position deviations between the sampling positions and the interpolating positions.

* * * * *